United States Patent [19]

Shibamiya et al.

[11] Patent Number: 4,956,774
[45] Date of Patent: Sep. 11, 1990

[54] DATA BASE OPTIMIZER USING MOST FREQUENCY VALUES STATISTICS

[75] Inventors: Akira Shibamiya, Los Altos; Melvin R. Zimowski, San Jose, both of Calif.

[73] Assignee: International Business Machines Corporation, Armonk, N.Y.

[21] Appl. No.: 239,712

[22] Filed: Sep. 2, 1988

[51] Int. Cl.$^5$ .............................................. G06F 15/40
[52] U.S. Cl. ................................ 364/200; 364/282.1; 364/283.4
[58] Field of Search ....................... 364/200, 300, 900

[56] References Cited

U.S. PATENT DOCUMENTS 4,506,326  3/1985  Shaw et al. .......................... 364/300
4,606,002  8/1986  Waisman et al. ................ 364/300 X
4,805,099  2/1989  Huber ................................. 364/300

OTHER PUBLICATIONS

Selinger et al., "Access Path Selection in a Relational Database Management System", IBM Research Report, RJ2429(32240), (1979).
Astrahan et al., "Evaluation of the System R Access Path Selection Mechanism", IBM Research Report, RJ2797(35713), (1980).
Piatetsky-Shapiro et al., "Accurate Estimation of the Number of Tuples Satisfying a Condition", Proc. of ACM-SIGMOD, Boston, MA, 1984.
Lakshmi, et al., "Access Path Selection in Relational Database Systems", IBM Technical Disclosure Bulletin, vol. 30, No. 9, pp. 420-421, (1988).
C. A. Lynch, "Extending Relational Database Management Systems for Information Retrieval Applications", University of California, PhD, Computer Science, Thesis, pp. 112-146, (Approved: 11/10/87).
C. Hulten, "An Index Organization for Applications with Highly Skewed Access Patterns", IEEE 5th International Conf. on Software Engineering, Mar. 1981, pp. 71-78.

Primary Examiner—Raulfe B. Zache
Attorney, Agent, or Firm—Pryor A. Garnett

[57] ABSTRACT

A method for more accurately estimating the time required to process a data base query using a selected index. A selected number of the most frequently occurring index key values (38) are collected during an index sequential scan. These most frequency occurring values are stored as percentage frequencies of occurrence in the data base system's catalog (42). Estimated access and processing times (NPAR, NPAS, NCPU) for a given query are calculated based on the stored frequencies where possible. Where the query's search criteria specify values other than the stored most frequently occurring values, those values are assumed to be uniformly distributed.

9 Claims, 4 Drawing Sheets

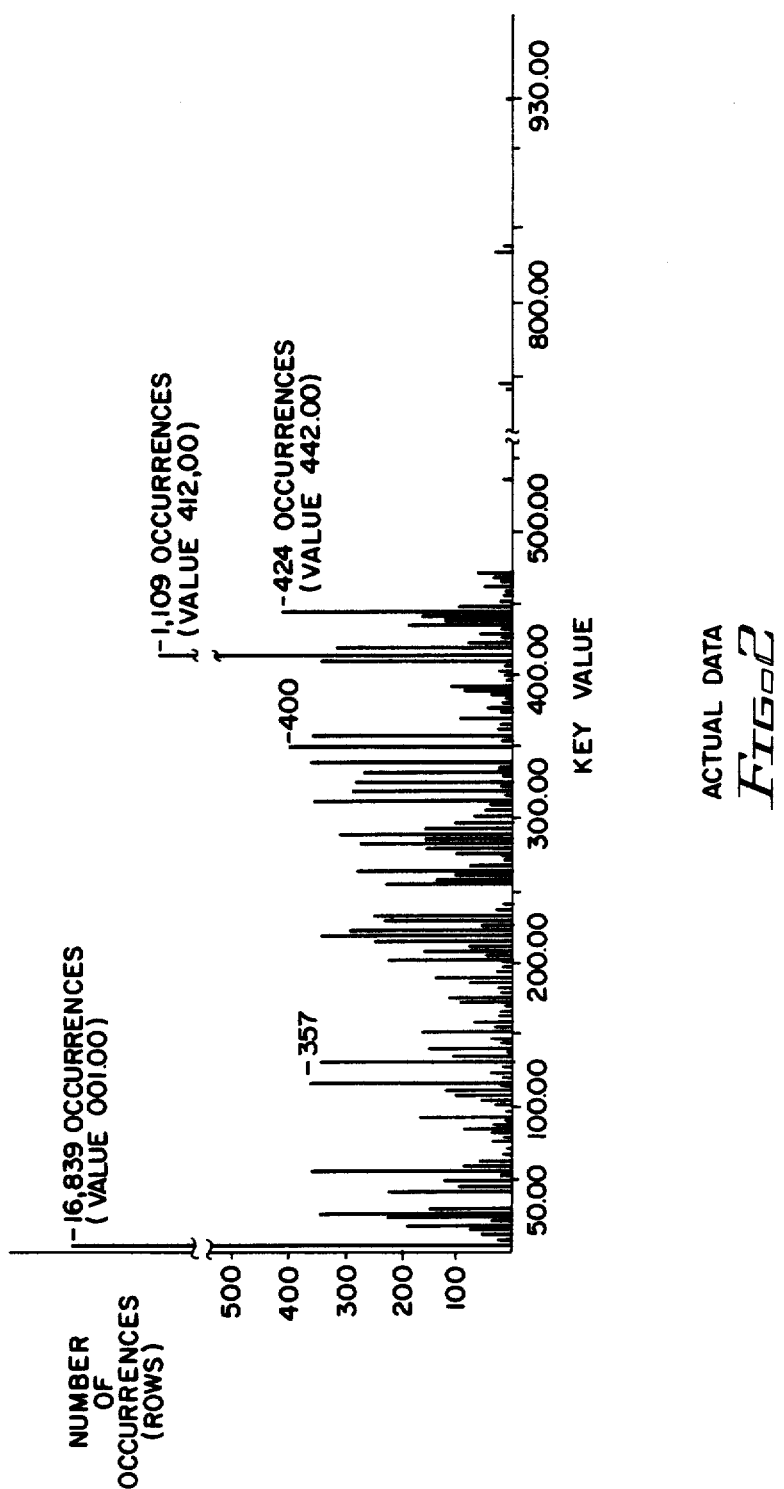

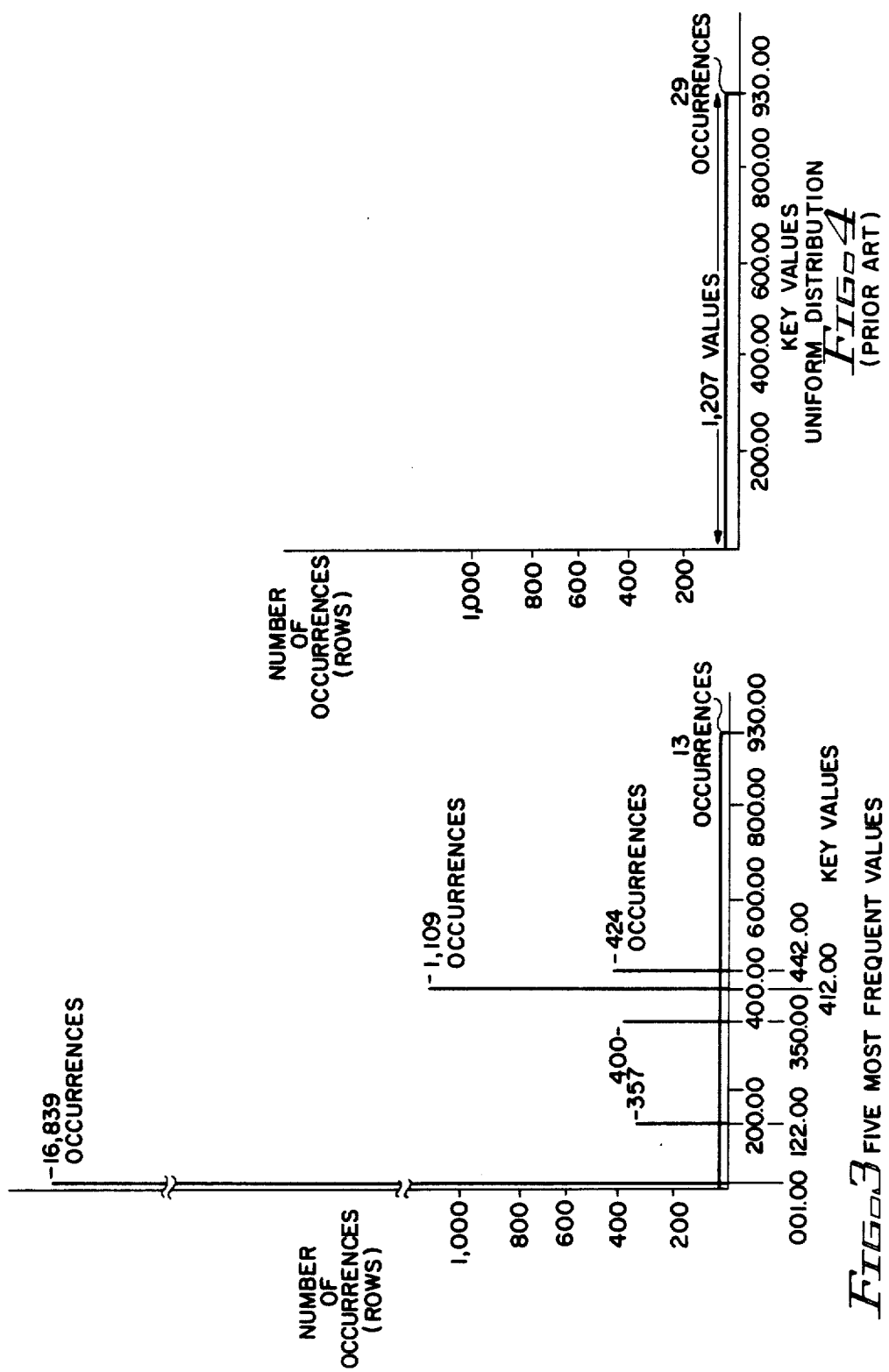

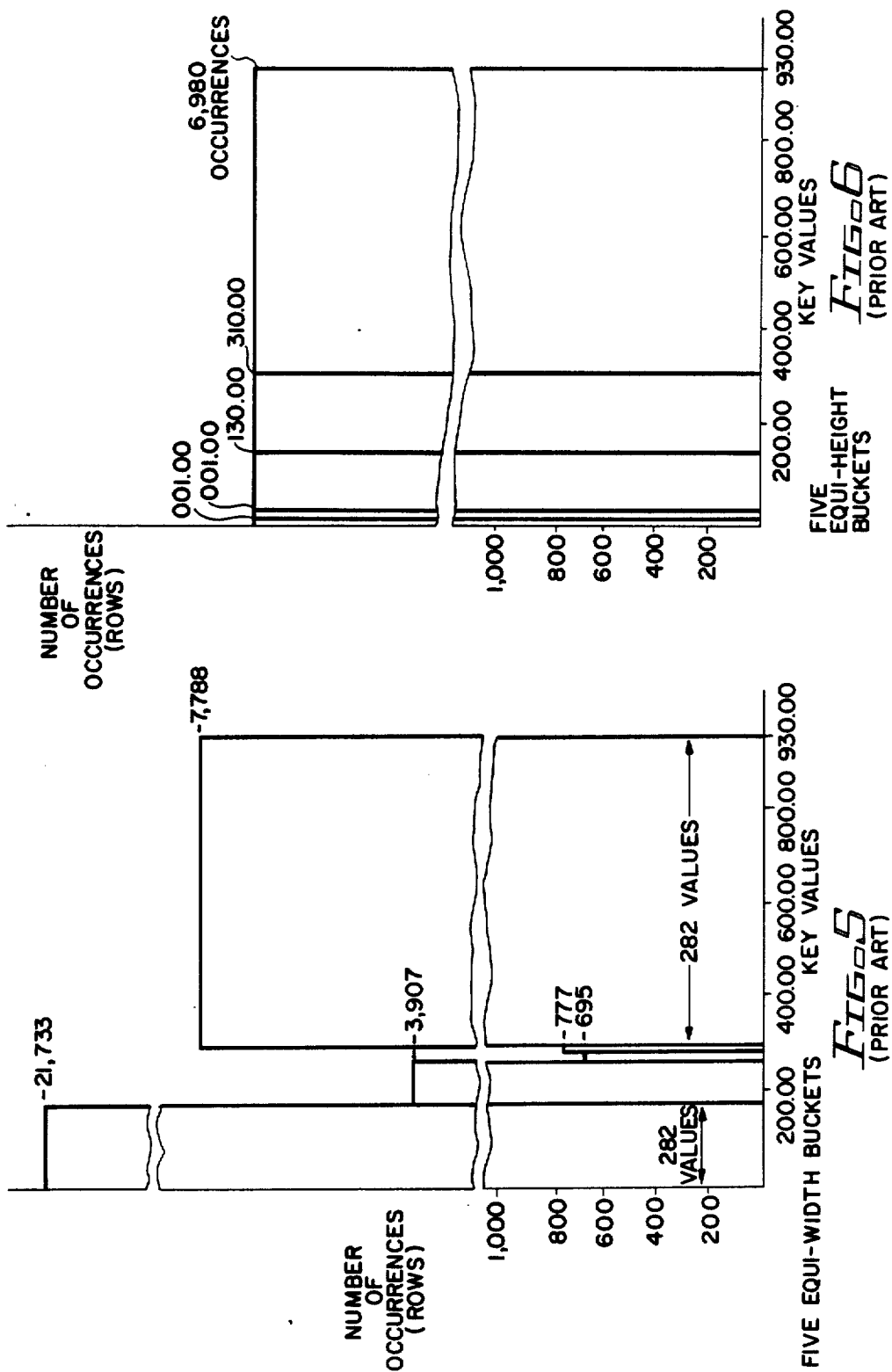

DATA BASE OPTIMIZER USING MOST FREQUENCY VALUES STATISTICS

BACKGROUND OF THE INVENTION

1. Technical Field

This invention relates to relational data base management systems, and more particularly, to the automatic selection of a data access strategy for the retrieval of data stored within relational data bases.

2. Description of the Prior Art

A data base management system (DBMS) is a computer system for recording and maintaining data. A relational data base management system stores data as rows in tables, and refers to a collection of tables as a data base. Users or application programs manipulate (select, update, insert, or delete) data by issuing requests or commands (called queries) against the data base. In a relational data base management system's data query and manipulation language, such as SQL, requests are nonprocedural (also referred to as nonnavigational). That is, users or application programs simply specify what is wanted, rather than specifying how to accomplish it. The system's optimizer has the responsibility for determining the optimal strategy for obtaining the data.

Relational data base management systems store rows of tables in data pages on physical storage devices such as disk drives. Data is transferred between the physical storage and the computer system's central processing unit (CPU) page by page, even though only a single row may be needed from a given data page. The time it takes to transfer data between physical storage and the processing unit is many times greater than the time it takes to process the data in the processing unit. Furthermore, the time it takes to randomly access separate physical data pages is as much as ten times longer than the time needed to sequentially access adjacent data pages. To manipulate data in a relational data base, the rows must first be transferred from physical storage to the processing unit, then processed in the processing unit, and finally transferred back to physical storage. Because transferring takes so much longer than processing, the total time required to manipulate the data can be dramatically reduced if the number of transfers can be reduced.

The data access strategy chosen by a system optimizer specifies the exact way (or access path) for obtaining and processing the data pages of a table. One way to access data is to sequentially scan every row in a table for those rows which match the search criteria. This is known as a table scan, because the entire table is scanned in sequence, data page by data page, from beginning to end.

Most relational data base systems also maintain indexes for their tables. An index is a list that a data base management system uses to access the rows of a table in a selected order. An index consists of many index entries. Each index entry contains a key value and an identifier of or pointer to the one or more rows of the table that contain the key value. Data base management systems typically store indexes on index pages that are physically separate from the data pages of the corresponding table.

One method of storing an index's pages is as a B-tree. A B-tree consists of a root page, intermediate pages that are dependent on the root page, and index leaf pages at the lowest level of the tree that are dependent on the intermediate pages. The term B-tree is a shortened name for "balanced tree", and refers to the balanced or roughly equal number of index pages to which each such root or intermediate index page points. The B-tree's leaf pages contain the index entries. To scan a table's rows in the order specified by the index, the index's leaf pages are scanned sequentially and the index entries on each leaf page are used to access the rows in the index's order. This scan is called an "index sequential scan".

There are two general types of indexes: clustering and nonclustering. An index is a "clustering index" if an index sequential scan causes only a single access of each data page. For this to occur, the table rows must be stored in the data pages of physical storage in approximately the same sequence as specified by the index. An index sequential scan through a clustering index (also referred to as a clustering index scan) is fast because the number of data page accesses is minimized. There are no duplicate accesses to the same data page, and both the index leaf pages and the data pages can be accessed sequentially rather than at random.

An index is a "nonclustering index" if an index sequential scan causes the system to access the data pages back and forth at random. Index sequential scans through nonclustering indexes (also referred to as nonclustering index scans) are extremely slow, because there is much thrashing back and forth between data pages. This type of index sequential scan requires separate data pages to be randomly accessed and transferred into and out of the processing unit's main memory, but usually only accesses one row from the many rows available on each such data page.

When the search criteria in a query specify the key columns of an index, that index can often provide a more efficient access path than a table scan for identifying and obtaining the data rows that satisfy or match the search criteria. The optimizer determines which of the available access paths is the most efficient based on statistical information about the data and on certain assumptions about the data. The types of statistical information about the data in a table that typically influence an optimizer's choice include the total number of rows in the table, the total number of data pages on which the rows of the table appear, the number of distinct index key values for each index defined on the table, the range of values for the first column of the index key of each index defined on the table, the number of levels in each index defined on the table, and the number of leaf pages in each index defined on the table.

The optimizer estimates the efficiency of the various available access paths using mathematical formulas that require the statistical information as input. The calculations that the mathematical formulas define make certain assumptions about the interpretation of the statistical information. Several formulas, for instance, make an assumption about the distribution of index key values when estimating the selectivity of the search criteria present within a data base query. The accuracy of the optimizer's estimates, and therefore the efficiency of the selected access path, depends critically on the availability of accurate statistical information about the data and on the degree to which optimizer assumptions about the data remain valid. Invalid assumptions about the uniform distribution of index key values can result in drastic performance degradation, including greatly increased CPU utilization and slower response times, in both single table queries and queries that join as few as two tables. The prior art "uniform distribution", "equi-width histogram" and "equi-height histogram" methods discussed below all make invalid assumptions about nonuniformly distributed ("skewed") index key values.

The "uniform distribution method" assumes that index key values are distributed between the lowest existing key value and the highest existing key value with equal frequency. Known current relational DBMS prototypes and products use this method, assuming uniform distributions of index key values and ignoring the possibility of non-uniform distributions.

The "equi-width histogram" approach divides the range of occurring index key values into equal-sized subranges or buckets. Each bucket contains the same number of distinct key values from the range of occurring index key values, but the number of actual occurrences of index key values that correspond to each bucket may vary drastically due to the occurrence of multiple rows with the same key value. The equi-width histogram approach selects access paths to nonuniformly distributed data little, if any, better than the uniform distribution assumption used by current prototypes and products. The equi-width histogram method assumes a uniform distribution of index key values within individual buckets.

The "equi-height histogram" approach, proposed by Piatetsky-Shapiro et al. in "Accurate Estimation of the Number of Tuples Satisfying a Condition", Proc. of ACM-SIGMOD, Boston, MA, 1984, divides the set of actual occurrences of index key values into equal-sized buckets. Each bucket contains the same number of actual occurrences of index key values, but the number of distinct key values that correspond to each bucket varies from bucket to bucket. Like the equi-width histogram method, the equi-height method assumes that actual occurrences of index key values within individual buckets are uniformly distributed. The equi-height histogram approach handles highly skewed data better than the uniform distribution and equi-width histogram approaches, but performs poorly when considering queries including "equal to" ("=") operators.

There is therefore a need for an improved method of selecting an access path in a relational data base management system having nonuniformly distributed index key values.

Lakshmi and Yu, "Access Path Selection in Relational Data Base Systems", IBM Technical Disclosure Bulletin, Feb., 1988, pp. 420-21, propose collecting distribution statistics on all index key values. This indiscriminate statistical collection entails greatly increased processing and computational overhead, resulting in poorer performance. There is therefore also a need for a method of collecting and storing frequency of occurrence statistics for index key values without incurring excessive processing overhead.

SUMMARY OF THE INVENTION

This invention provides an improved method for selecting an access path in a relational data base management system having at least one index. The invention comprises an improved method for selecting a query's access path in a relational data base management system which as at least one index. The first step is to select a number of most frequently occurring values of at least part of a key of the index. This number is greater than zero and less than the total number of such values. Statistics on the frequency of occurrence of the selected values are collected. An estimate of the time required to use the index as the access path is made, based at least in part on the index's most frequently occurring values statistics. This estimate is used as the basis at least in part for selecting an access path for the query.

BRIEF DESCRIPTION OF THE DRAWINGS

FIG. 2 is a histogram of an actual distribution of index key values.

FIG. 3 is a histogram of the distribution of index key values as estimated by the "most frequent values" method of this invention.

FIG. 4 is a histogram of the distribution of index key values as estimated by the prior art "uniform distribution" method.

FIG. 5 is a histogram of the distribution of index key values as estimated by the prior art "equi-width histogram" method.

FIG. 6 is a histogram of the distribution of index key values as estimated by the prior art "equi-height histogram" method.

DESCRIPTION OF THE PREFERRED EMBODIMENT

Figure 1:
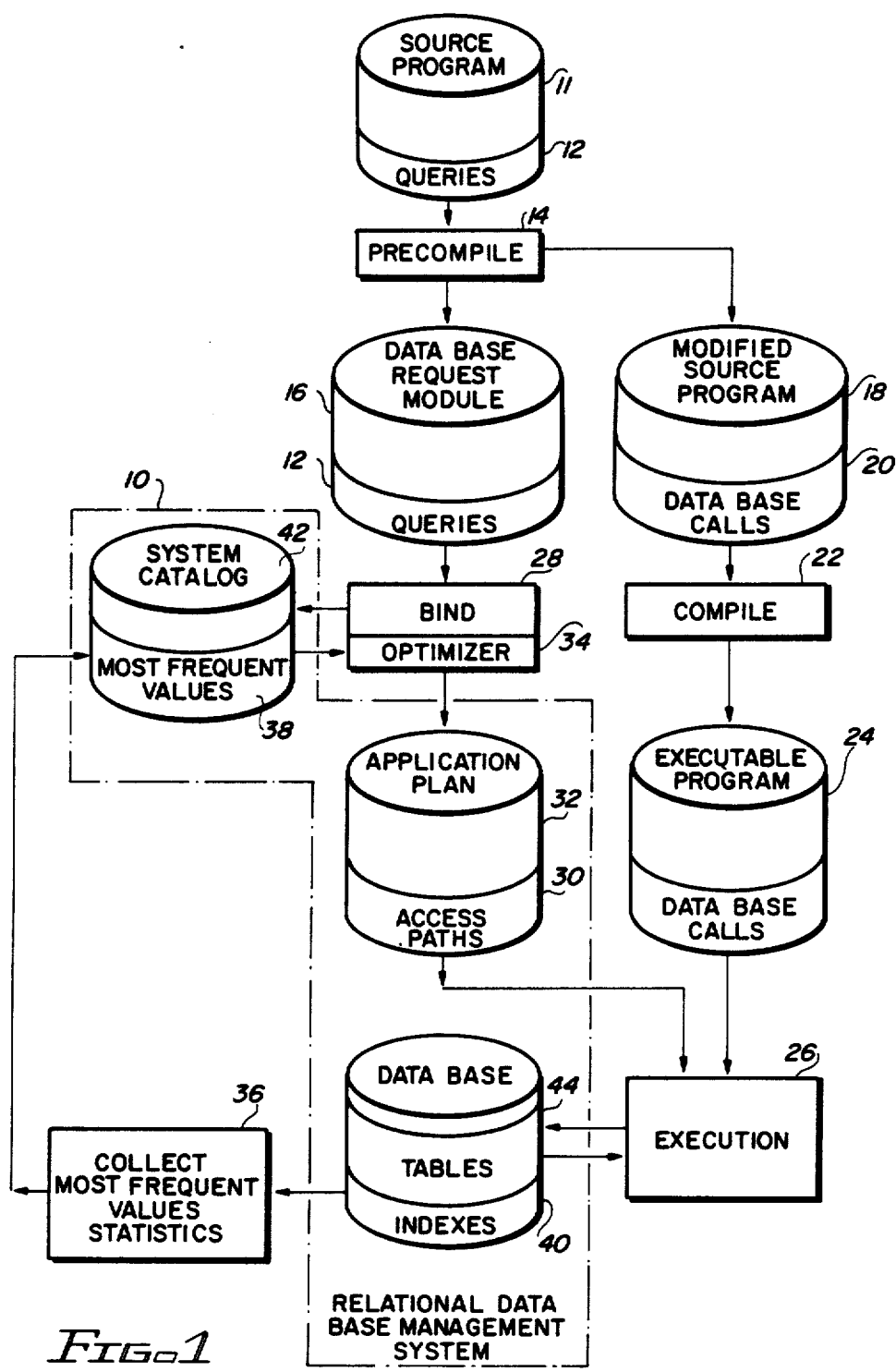
FIG. 1 is a schematic overview of the precompilation and binding of a source program which includes data base queries, and shows the "most frequent value" statistics stored in the data base system catalog.

FIG. 1 shows a schematic overview of the use of the method of this invention in the relational data base management system 10 known as DATABASE 2, or DB2, of the International Business Machines Corporation. An application source program 11, written in a programming language such as COBOL or PL/I, includes data base queries 12. These queries 12 comprise statements in a query language such as SQL which are embedded in the source program 11. Precompilation 14 extracts the queries 12 from the source program 11, checks their syntax, and copies them into a data base request module 16. Precompilation 14 also produces a modified version of the source program which contains embedded calls 20 to the data base system 10 in place of the embedded queries 12. The modified source program 18 is then compiled 22 into an executable program 24. The executable program 24 contains the data base calls 20 placed in the modified source program 18 during precompilation 14. When the executable program 24 is executed 26, the data base calls 20 result in the execution of the original queries 12.

The queries 12 in the source program 11 and data base request module 16 specify the particular operations (SELECT, INSERT, DELETE, OPEN, ... ) which are to be performed by the system 16, but not the specific steps for performing them. This is one of the most powerful features of relational data base management systems, because it frees the applications programmer from much tedious programming. The system 10 specifies the steps needed to satisfy each query during the binding phase 28, and stores those steps as "access paths" 30 in an application plan 32. Because there are usually several possible alternative access paths 30 for each query 12, the bind phase 28 includes an "optimizer" 34 for selecting the best access path for each query.

The preferred embodiment of this invention first collects frequency of occurrence statistics about the N most frequent values appearing within the first column of the key or a partially ordered subset of the key columns (first and second key columns, first and second and third key columns, etc.) of an index. The value of N is known to the method through prior definition to the computing system. The method uses the frequency of occurrence statistics to calculate the number of rows matching a search criterion (or query predicate) that appears within a data base request and corresponds to the index. The method then calculates a filter factor from the number of matching rows and uses the filter factor to estimate the number of page accesses and the amount of row processing required during an index sequential scan using the index. The optimizer compares this estimate with the cost estimates for the other available access paths to select the most appropriate data access strategy for processing the data base request.

The preferred embodiment of the "most frequent values" method consists of two major phases. In the "collection phase" 36, frequency of occurrence statistics 38 for the "N" most frequent values are collected and saved for each of the data base system's indexes 40 in the system catalog 42. This collection 36 is initially done after each table 44 has been initially populated (loaded) with records and indexed. Collection 36 is also done whenever the table's contents (and thus the index's key values) are significantly changed by insertions, updates, or deletions of records. This ensures that up-to-date statistics are maintained for each index.

In the second phase of this invention, the collected statistics saved in the system catalog 42 are utilized by the optimizer 34 during the bind process 28 to estimate the time required to use each of the various access paths 30 available to satisfy each query 12. The accurate estimates provided by this invention allows the optimizer 34 to reliably select the best access path 30 for each query 12.

Example 1 is a pseudocode implementation of a program fragment that collects frequency of occurrence statistics about the N most frequent values appearing within the first column of the key of an index.

Example 1

Collection of Statistics on Most Frequent Values

```
101   Initialize the N element collection array.

102   Set the total index entry count = 0.
103   Set the current occurrence count = 0.
104   Set the index nonuniformly distributed flag = no.

105   Obtain the first index entry.
106   IF successful
107   THEN

108       DO
109         Current value = the value of the first column of
                the key of the first index entry.
110         Prior value = the value of the first column of the
                key of the first index entry.
111       END 112   DO UNTIL all the index entries have been processed 113       Increment the total index entry count by 1.

114       IF the current value is not equal to the prior
                value
115       THEN
```

| | |
|---|---|
| 116 | DO |
| 117 | Scan the collection array entries that currently contain statistical information backwards from the bottom of the collection array towards the top of the collection array. |
| 118 | Locate the collection array entry with the smallest occurrence count that is greater than or equal to the current occurrence count. |
| 119 | IF all collection array entries have an occurrence count that is less than the current occurrence count |
| 120 | THEN |
| 121 |     IF the first column value of the first collection array entry is nonzero |
| 122 |     THEN |
| 123 |         Set the index nonuniformly distributed flag = yes. |
| 124 | ELSE |
| 125 |     IF the first column value of the located collection array entry is not equal to the current value. |
| 126 |     THEN |
| 127 |         Set the index nonuniformly distributed flag = yes. |
| 128 | IF all collection array entries have an occurrence count that is less than the current occurrence count |
| 129 | THEN |
| 130 |     DO |
| 131 |     Move each collection array entry that currently contains statistical information down one entry in the array, discarding the last collection array |

|     | entry when all the collection array entries already contain statistical information. |
| --- | --- |
| 132 | Copy the prior value and the current occurrence count (for the prior value) into the first collection array entry. |
| 133 | END |
| 134 | IF the located collection array entry is not the last collection array entry |
| 135 | THEN |
| 136 | DO |
| 137 | Move each collection array entry that currently contains statistical information and that follows the located collection array entry down one entry in the array, discarding the last collection array entry when all the collection array entries already contain statistical information. |
| 138 | Copy the prior value and the current occurrence count (for the prior value) into the collection array entry that follows the located collection array entry. |
| 139 | END |
| 140 | Set the current occurrence count (for the current value) = 1. |
| 141 | END   /= see line 116 =/ |
| 142 | ELSE |
| 143 | Increment the current occurrence count by 1. |
| 144 | Obtain the next index entry. |

| | |
|---|---|
| 145 | IF successful |
| 146 | THEN |
| 147 |     DO |
| 148 |     Set the prior value = the current value |
| 149 |     Set the current value = the value of the first column of the key of the next index entry. |
| 150 |     END |
| 151 | ELSE |
| 152 |     DO |
| 153 |     Scan the collection array entries that currently contain statistical information backwards from the bottom of the collection array towards the top of the collection array. |
| 154 |     Locate the collection array entry with the smallest occurrence count that is greater than or equal to the current occurrence count. |
| 155 |     IF all collection array entries have an occurrence count that is less than the current occurrence count |
| 156 |     THEN |
| 157 |         IF the first collection array entry's first column value is nonzero |
| 158 |         THEN |
| 159 |             Set the index nonuniformly distributed flag = yes. |
| 160 |     ELSE |
| 161 |         IF the located collection array entry's first column value is not equal to the current value |
| 162 |         THEN |
| 163 |             Set the index nonuniformly distributed flag = yes. |

| | |
|---|---|
| 164 | IF all collection array entries have occurrence counts less than the current occurrence count |
| 165 | THEN |
| 166 |     DO |
| 167 |     Move each collection array entry that currently contains statistical information down one entry in the array, discarding the last collection array entry when all the collection array entries already contain statistical information. |
| 168 |     Copy the prior value and the current occurrence count (for the prior value) into the first collection array entry. |
| 169 |     END |
| 170 | IF the located collection array entry is not the last collection array entry |
| 171 | THEN |
| 172 |     DO |
| 173 |     Move each collection array entry that currently contains statistical information and that follows the located collection array entry down one entry in the array, discarding the last collection array entry when all the collection array entries already contain statistical information. |
| 174 |     Copy the prior value and the current occurrence count into the collection array entry that follows the located collection array entry. |
| 175 |     END |
| 176 | Set the current occurrence count (for the current value) = 1. |

```
177        END     /= see line 152 =/

178    END DO UNTIL    /= see line 112 =/

179    IF the total index entry count is greater than 0 AND
       the index nonuniformly distributed flag = yes
180    THEN 181        DO FOR EACH collection array entry that currently
           contains statistical information 182            Divide the collection array entry's
               occurrence count by the total index entry
               count.
183            Multiply the result by 100, and round each
               result to the nearest integer, to determine
               the frequency of occurrence of the entry's
               value as a percentage of the total
               occurrences in the index of all such values.

184            Store the value and the percentage frequency
               of occurrence for later reference by the
               optimizer.
185        END DO FOR EACH.
```

The program fragment of Example 1 operates as follows. The fragment counts the N most frequent values of the first column of the index key by performing an index scan over the index (lines 101-178). After the last occurrence of a given value has been read, the fragment checks whether the number of occurrences of that value is greater than any of the stored counts of occurrences of previously scanned values (lines 114-127 and 151-163). If the number of occurrences is greater than at least one stored count, then the program fragment stores this new count, replacing the smallest existing stored count when the program fragment has already stored N counts. If the number of occurrences is less than all stored counts, but the program fragment has not yet stored N counts, then the program fragment also stores this new count (lines 124-139 and 164-175). Otherwise, the program fragment discards the new count. After completing the scan of the index, the fragment calculates the frequency of occurrence statistic for the value of the first column of the key that corresponds to each stored count (lines 179-185).

Lines 101-111 initialize various working areas of storage that the collection process depends on. Line 101 initializes the storage area of the N element array used for collecting the frequency of occurrence statistics about the N most frequent values of the first column of the key. The program fragment collects and orders statistics within this array in order of decreasing frequency of occurrence. Lines 102-104 initialize count and flag fields that track and summarize the processing of index entries. Line 102 sets the total count of entries (occurrences) in the index to zero. Line 103 sets to zero the count of occurrences of the current value of the first key column. Line 104 initializes the flag that records whether the key values within the index are uniformly or nonuniformly distributed. The initial assumption is that the index is uniformly distributed.

Line 105 obtains the first index entry from the index. Lines 106-111 initialize value fields that track index entry key value changes during the collection process. Line 109 initializes the value of the first column of the key of the index entry currently under consideration (the current value) to the value of the first column of the key of the first index entry. Line 110 initializes the value of the first column of the key of the prior index entry that was under consideration (the prior value) to the value of the first column of the key of the first index entry.

Lines 112-178 examine each entry in the index in index order, collecting occurrence totals for the N most frequent values of the first column of the key. Line 113 increases the total count of index entries that have been obtained by one. Line 114 compares the value of the first column of the key of the current index entry with the value of the first column of the key of the prior index entry.

When the values are unequal, the last occurrence of the prior index value has been counted, and the program fragment examines the collection array. If the collection array has a free entry, the program fragment adds the value of the first column of the key of the prior index entry and its occurrence total to the collection array. If the collection array has no free entries but does contain an entry for a less frequent value of the first column of the key, the program fragment discards the first key column value and occurrence total for the least frequent value of the first column of the key within the collection array. The program fragment then adds the first column of the key of the prior index entry and its occurrence total to the collection array, maintaining the ordering of the entries in the collection array by frequency of occurrence.

When the program fragment adds an entry to the collection array with a frequency of occurrence that is different than at least one existing collection array entry, it records the fact that the index key values are nonuniformly distributed. Lines 117-118 scan the collection array to locate the collection array entry with the smallest first column value count that is greater than or equal to the current first column value count. Lines 119-127 determine whether the current first column value count demonstrates that the index key values are nonuniformly distributed. Lines 128-133 add a new first key column value and frequency count to the first entry of the collection array. Lines 134-139 add a new first key column value and frequency count to an entry other than the first entry of the collection array. Line 140 resets the current first column value count to one.

When the comparison of line 114 determines that the value of the first column of the key of the current index entry is equal to the value of the first column of the key of the prior index entry, line 143 increases the count of index entries having the same current first key column value by one.

Line 144 obtains the next index entry from the index. Line 148 sets the value of the first column of the key of the prior index entry to the value of the first column of the key of the current index entry. Line 149 sets the value of the first column of the key of the current index entry to the value of the first column of the key of the next index entry. The program fragment repeats this analysis process (lines 113-149) for the new current index entry and for all remaining entries of the index. When the program fragment has obtained and processed all the entries in the index, line 144 will fail to obtain a next index entry. Lines 152-177 of the program fragment then examine the collection array one more time to determine whether the value of the last first key column obtained from the index is one of the N most frequent values of the first column of the key. The processing that occurs is exactly the same as the processing that occurs in lines 116-141.

The collection of the occurrence counts of the N most frequent value is now complete. The remainder of the program fragment calculates a frequency of occurrence statistic for each frequency of occurrence count and stores the results for future use. Line 179 verifies that the index did, in fact, contain nonuniformly distributed index key values. If the index key values are nonuniformly distributed, the program fragment executes lines 182-184 for each most frequent value occurrence count collected. Lines 182-183 calculate the frequency percentage for a most frequent value of the first column of the key and rounds the result to the nearest integer. Line 184 stores the most frequent value of the column of the key and its frequency percentage in the catalog of the relational data base management system.

If statistics are desired for the entire values of the index key, rather than the values of the key's first column as shown in Example 1, the program fragment of Example 1 is modified by substituting "key value" for "first column value " through the fragment.

The task of the optimizer 34, presented with a query 12 into a data base table 44, is to select the fastest access path 30 for that query. The optimizer 34 can choose between a sequential table scan through the entire table 44, or an index scan using an index 40 corresponding to one of the query's search criteria. Where two or more search criteria have corresponding indexes 40, the optimizer 34 must choose between these alternative candidate indexes.

Example 2 contains a pseudocode implementation of this invention's method for using the frequency of occurrence statistics collected and stored according to the program fragment of Example 1, to calculate the estimated access time for an indexed access path 30. This estimated access time can then be used by the optimizer 34 to select an access path 30 for a query 12, a process which is known in the art and therefore not described further in this application.

---

Example 2

Calculation of Estimated Access Time

```
201  N    = number of most frequent values for index.
           /= collected and saved as in Example 1, above =/
202  FSUM = sum of percentage frequencies of occurrence of
           most frequent values.
           /= collected and saved as in Example 1, above =/
```

```
03  NV  = number of distinct values in index.

04  IF query is type "column = literal"
05  THEN
06      DO.
07      V = value of literal in query.
08      Search the system catalog for a most frequent
        value satisfying the query (i.e. = V).
09      IF a match is found
10      THEN
11          FF = corresponding percentage frequency of
             occurrence saved in the system catalog.
12      ELSE   /= no match is found, assume uniform
        distribution =/
13          FF = (100-FSUM) / (NV-N).
14      END.

15  HV  = highest value found in index.
16  LV  = lowest value found in index.

17  IF query is type "column > literal"
18  THEN
19      DO.
20      V = value of literal in query.
21      Search system catalog for stored most frequent
        value satisfying query (i.e., > V).
22      FMFV = sum of stored percentage frequencies for
        matching most frequent values.
             /= actual frequency of stored values
             satisfying query =/
23      FUD = (100-FSUM) x (HV-V) / (HV-LV).
             /= uniform distribution assumed for remaining
             values satisfying query =/
24      FF = FMFV + FUD.
25      END.
```

```
226  IF query is type "column < literal"
227  THEN

228      DO.
229      V = value of literal in query.
230      Search system catalog for stored most frequent
         values satisfying query (i.e., < V).
231      FMFV = sum of stored percentage frequencies for
         matching most frequent values.
             /= actual frequency of stored values
             satisfying query =/
232      FUD = (100-FSUM) x (V-LV) / (HV-LV).
             /= uniform distribution assumed for remaining
             values satisfying query =/
233      FF = FMFV + FUD.
234      END.

235  IF query is type "column > literal1 and column <
     literal2"
236  THEN
237      DO.
238      V1 = value of literal1 (">") in query.
239      V2 = value of literal2 ("<") in query.
240      Search system catalog for stored most frequent
         values satisfying query (i.e., > V1 and < V2).
241      FMFV = sum of stored percentage frequencies for
         matching most frequent values.
             /= actual frequency of stored values
             satisfying query =/
242      FUD = (100-FSUM) x (V2-V1) / (HV-LV).
             /= uniform distribution assumed for remaining
             values satisfying query =/
243      FF = FMFV + FUD.
244      END.

245  NR = total number of rows in table.
```

246 NDP = total number of data pages in table.
        /= typically much less than NR =/
247 NLP = total number of leaf pages in index.
        /= typically much less than NDP =/
248 NL = number of levels in index (including root and leaf levels).
        /= typically much less than NLP =/

249 /= Estimate times using filter factor FF calculated above =/
250 IF index is clustered
251 THEN
252     DO.
253         NPAR = NL.
                /= estimated number of random page accesses =/
254         NPAS = (NLP x FF/100) + (NDP x FF/100)
                /= estimated number of sequential page accesses =/
255         NCPU = NR x FF/100
                /= number of rows processed in CPU =/
256     END.
257 ELSE
        /= index is nonclustered =/
258     DO.
259         NPAR = NL + (NR x FF/100).
                /= estimated number of random page accesses =/
260         NPAS = (NLP x FF/100)
                /= estimated number of sequential page accesses =/
261         NCPU = NR x FF/100
                /= number of rows processed in CPU =/
262     END.

263 TPAR = average time for one random page access
264 TPAS = average time for one sequential page access
265 TCPU = average time to process one row in CPU

```
266    TIME = (NPAR x TPAR) + (NPAS x TPAS) + (NCPU x TCPU)
       /= estimated total time for using index as access
       path =/
```

Access cost calculators as shown in Example 2 are performed for each index corresponding to a search criterion in the query. The frequency of occurrence statistics collected for the N most frequent values of the index key to provide much better accuracy in estimating the number of pages accessed (both randomly and sequentially) and the number of rows processed. These accurate estimates produce a much more accurate estimate of the total time involved in using the index as the access path for the query. The optimizer can then more reliably choose the fastest access path from among the possibilities analyzed.

The program segment of Example 2 comprises four main sections. Lines 204–214 calculate the estimated filter factor FF for queries having search criteria of the form "column=literal". The filter factor FF is a number between 0 and 100 representing the percentage of the total rows and pages in the table and index which will be accessed. Lines 217–227 calculate the filter factor FF for queries of the type "column>literal", and lines 226–234 calculate the filter factor FF for queries of the type "column<literal". "BETWEEN" type queries, having search criteria of the form "column->literal1 and column<literal2", are considered in lines 235–244. Finally, the estimated total time TIME for the access path is calculated in lines 245–266. Clustered and nonclustered indexes are analyzed separately in lines 250–256 and 257–262, respectively.

The program fragment begins by storing certain common values used in all the filter factor calculations for the different types of queries. Line 201 stores the number of most frequent values 38 collected and saved in the system catalog 42. This number is generally relatively small (e.g., about 5), and should not be greater than about one-fifth of the number of distinct values in the index to avoid excessive overhead. FSUM is the total of the percentage frequencies of occurrence of the N most frequent values. Thus, if the first most frequent value occurred 13 percent of the time, the second 10 percent of the time, and the third, fourth, and fifth 2 percent each, FSUM would be equal to 29 percent. In line 203, the number of distinct key values in the index is stored in NV.

Queries which search for single specific values, by specifying the "=" (equal to) operator in their search criterion, are processed in lines 204–214. The value being searched for, known as the "literal", is stored as V in line 207. The most frequent values 38 stored in the system catalog 42 are then searched in line 208 for a most frequent value equal to the literal V. If the literal V is one of the stored most frequent values, then the filter factor FF for the query is equal to the corresponding percentage frequency of occurrence stored for that value V in the system catalog (line 211). However, if the literal value V is not found in the list of most frequent values 38, the filter factor FF for the query is calculated assuming a uniform distribution for all values other than the stored N most frequent values (line 213).

Queries including search criteria with ">", "<", and "BETWEEN" operators are analyzed between lines 215 and 244. Lines 215 and 216 respectively store the highest and lowest key values found in the index. These high and low values HV, LV are required for calculations of the filter factor for key values other than the N most frequent values. These calculations are based on the uniform distribution assumption.

Queries of the type "column>literal" are processed in lines 217–225. The value of the literal specified in the query's search criterion is stored as V by line 220. Line 221 then searches the system catalog for all of the stored N most frequent values 38 which satisfy the search criterion, i.e., which are greater than the literal V. The percentage frequencies of occurrence of each of these matching most frequent values 38 are then summed and stored as FMFV (line 222). FMFV thus stores the actual frequency of occurrence of those index values which satisfy the query's search criterion and which are among the N most frequent values of the index. The filter factor for the remaining index values matching the search criteria is estimated and stored as FUD at line 223 using the uniform distribution assumption and based on the literal V's position in the range between the highest and lowest values HV, LV of the index. Finally, the filter factor FF for this ">" type of query is estimated by adding the actual frequency of occurrence FMFV for the most frequent values matching the criteria, and the estimated frequency of occurrence (filter factor) FUD for the remaining values satisfying the query.

Queries of the type "column<literal" are handled in lines 226–234 very similarly to the ">" queries discussed above. The literal value V is stored by line 229, and line 230 searches the system catalog for stored most frequent values satisfying the query, i.e., less than the literal value V. The sum of the stored percentage frequencies of occurrence for those of the N most frequent values satisfying the query is stored as FMFV by line 231. The estimated frequency of occurrence of the remaining values satisfying the query is calculated and stored as FUD using the uniform distribution assumption at line 232. The estimated filter factor FF for the "<" type of query is calculated by adding FMFV and FUD.

"BETWEEN" type queries, having search criteria of the form "column>literal1 and column<literal2" are handled by lines 235–244. The values V1, V2 of the two literals in the query's search criterion are stored by lines 238–239, and the system catalog is then searched for stored most frequent values satisfying the query, i.e., falling between V1 and V2. Line 241 stores the sum of the percentage frequencies of occurrence for the matching most frequent values as FMFV. Line 242 calculates and stores the estimated frequency of occurrence (filter factor) FUD for the remaining index values satisfying the query, and line 243 adds this estimate FUD to the actual frequency of occurrence FMFV for the matching most frequent values to arrive at the estimated filter factor FF for this "BETWEEN" type of query.

The estimated time TIME required to use the index in question as the access path for the query is calculated based on the estimated filter factor FF in lines 245–266. Certain basic data needed for these calculations is stored at lines 245–248.

The estimated time TIME for the indexed access path depends significantly on whether the index is clustered or not. If the index is clustered (line 250), the pages of data can be accessed sequentially, eliminating a large number of time-consuming random page accesses. For a clustered index, the number of random page accesses NPAR is equal to the number of levels of the index, reflecting the fact that the index must be walked from its root to the leaf level containing the index entries, before those entries can be scanned sequentially. The estimated number of sequential page accesses NPAS is equal to the number of index leaf pages to be scanned plus the number of table data pages to be scanned. Each of these is estimated as the total number of pages multiplied by the overall filter factor FF for the query (line 254). The number of rows NCPU to be processed by the central processing unit (CPU) is estimated as the total number of rows in the table NR multiplied by the query's filter factor (line 255).

If the index is not clustered (line 257), the number of time-consuming random page accesses is much higher. As for clustered indexes, NL random page accesses are required to walk the index from its root to the leaf level. In addition, however, a random page access is required for each row to be accessed. The number of rows to be accessed is equal to the total number of rows in the table NR multiplied by the filter factor FF for the query (line 259). Sequential page accesses are still used to scan the leaf pages of the index (line 260), and the number of rows processed by the CPU (line 261) is the same as for the clustered index.

These numbers of random and sequential page accesses NPAR, NPAS, and rows processed in the CPU NCPU, are respectively multiplied by the average times required by those operations (line 266). The resulting TIME is an accurate estimate of the time required to execute the query using the index in question as the access path. Similar estimates are made for the other candidate indexes, and the index having the shortest overall TIME is selected as the access path (other considerations being equal).

As can be seen from the pseudocode, the estimated filter factor FF has a dominant effect throughout the analysis. Thus, using an accurate FF can considerably improve on the optimizer's ability to choose the most efficient access path.

Numerical Example

Consider a single table query Q on a table T containing 10,000 rows distributed over 500 data pages, and a nonclustering index I on a numeric column C of the table. The query could of course be satisfied by scanning all of the table's rows, in a process called a "sequential table scan". Such a table scan would require 1,000 milliseconds, computed as follows:

| Random page accesses: | |
|---|---|
| none | 0 ms |
| Sequential accesses: | |
| 500 @ 2 ms (data pages) = | 1,000 ms |
| Estimated total access time | 1,000 ms |

The index I has 1,000 distinct values distributed over 50 leaf pages, and has eight levels from root to leaf. If 10 rows of the table are estimated to satisfy the query's search criteria, then a sequential index scan would be calculated as requiring eight random page accesses to walk the index, one or two sequential accesses of leaf pages, and ten random accesses of data pages. Using an average time of 2 milliseconds (ms) for a sequential page access and 20 milliseconds (ms) for a random page access, using the index would appear to take only 364 ms for data access:

| Random page accesses: | |
|---|---|
| 8 @ 20 ms (walking the index) = | 160 ms |
| 10 @ 20 ms (data pages) = | 200 ms |
| Sequential accesses: | |
| 2 @ 2 ms (leaf pages) = | 4 ms |
| Estimated total access time | 364 ms |

However, if the estimated filter factor is incorrect due to a frequently occurring value satisfying the query, the actual access time required for the query will be much higher. For example, if in fact 100 rows satisfy the query, then the access time would be 2,200 ms, almost seven times higher, as follows:

| Random page accesses: | |
|---|---|
| 8 @ 20 ms (walk the index) = | 160 ms |
| 100 @ 20 ms (data pages) = | 2,000 ms |
| Sequential accesses: | |
| 20 @ 2 ms (leaf pages) = | 40 ms |
| Estimated total access time: | 2,200 ms |

Since a sequential table scan of all of the table's rows, using no index, would only require 1,000 ms, the inaccurate estimate of the query's filter factor would cause the optimizer to choose a nonoptimal access path (the nonclustered index scan) instead of the faster table scan.

Similar problems can occur when joining two or more tables using the common "nested join" technique. When the optimizer uses this method, it selects one table as the outer table and another table as the inner table. During execution, the entire inner table is scanned for each qualifying row of the outer table in order to perform the join.

Consider a query that joins two tables T1 and T2 each containing 10,000 rows. Suppose that 100 rows of T2 actually qualify, and that the optimizer selects the nested loop join method and accurately estimates that 100 rows of T2 qualify. If the number of rows of T1 that actually qualify differs significantly from the optimizer estimate, then the optimizer may select the wrong table as the outer table. As a result, the join will consume much more processing time and take considerably longer than expected.

For example, if the optimizer estimates that 10 rows of T1 qualify, then the optimizer would choose T1 as the outer table:

If T1 is the outer table then # rows scanned=10 (estimated qualifying rows in T1)×10,000 (T2 rows to be scanned for each T1 row) =100,000

If T2 is the outer table then # rows scanned=100 (qualifying rows in T2)×10,000 (T1 rows to be scanned for each T2 row)=1,000,000

On the other hand, if 500 rows of T1 actually qualify, as might be the case if a frequently occurring value in T1 qualified, then the optimizer should have chosen T2 as the outer table:

If T1 is the outer table then # rows scanned=500 (qualifying rows in T1)×10,000 (T2 rows to be scanned for each T1 row)=5,000,000

If T2 is the outer table then # rows scanned=100 (qualifying rows in T2)×10,000 (T1 rows to be scanned for each T2 row)=1,000,000

Because of the poor initial estimate of the number of qualifying T1 rows, the optimizer would have chosen a strategy which increased the join time fivefold. Errors in estimating the number of qualifying rows in both tables, and joins involving more than two tables, can produce optimizer errors several orders of magnitude greater than those illustrated above.

Comparison with Prior Art Methods

The advantages of the "most frequent values" method of this invention over the prior art methods identified above are best demonstrated by a comparison of their various accuracies in estimating filter factors for queries. The comparison uses the sample data shown in FIG. 2, which is taken from an actual operating situation. The data of FIG. 2 consists of a table containing 34,897 rows with 1,207 numeric key column values within the range 0.00 to 930.00, and contains sharp distributional skews. Of those 34,897 rows, almost half (16,839) contain the index key value "001.00". And of the 1,207 unique index values, over half (627) are in the range between 270.00 and 289.99. This sample data is characteristic of nonuniformly distributed data. The comparison examines queries with search criteria comprising "=" and "<" operators, and assumes that five "buckets" (N=5) are used by the various methods.

As seen in FIG. 2, "001" overshadows the rest of the values, occurring over 16,000 times. The next most frequent value, "412", occurs 1,109 times, less than one-tenth as frequently as the single most frequent value "001". All of the other existing values occur even less frequently.

Most Frequent Values Method

The "most frequent values" method of this invention collects and stores percentage frequencies of occurrence for the five most frequent values (N=5), and assumes a uniform distribution for all other key values. As shown in FIG. 3, the five most frequent values in the data of FIG. 2 are:

| "001" | 16,839 occurrences | 48% frequency |
|---|---|---|
| "412" | 1,109 | 3% |
| "442" | 424 | 1% |
| "350" | 400 | 1% |
| "122" | 357 | 1% |
| Total | 19,129 occurrences | 54% frequency |

The remaining 1,202 unique values occur in only 15,768 (34,897−19,129) rows, less than half the total rows in the table. The most frequent values method assumes that these remaining values are uniformly distributed, resulting in an average of about 13 occurrences for each row. In actuality, the number of occurrences for the remaining values varies from 1 to 355.

The estimate for any individual key value that matches one of the most frequent key values is the number of key value occurrences in the bucket containing the individual key value. For example, the estimate for the "column=001" predicate is the number of rows in the first bucket (i.e., 16,839). The estimate for any individual key value that does not match one of the most frequent key values is the number of rows (15,768) that do not have one of the most frequent key values, divided by the number of key values (1,202) that are not most frequent. For example, the estimate for the "column=278" predicate is (34,897−19,129) / (1207−5)=13. The estimates for various queries with "=" operators would therefore be:

| column = "001": | 16,839 occurrences (most frequent value) |
|---|---|
| column = "278": | (34,897 − 19,129)/(1,207 − 5) = 13 occurrences |
| column = "281": | (34,897 − 19,129)/(1,207 − 5) = 13 occurrences |
| column = "412": | 1,109 occurrences (most frequent value) |

It will be noted that the "most frequent values" method results in actual statistical values for the first and fourth queries, and results in estimated values for the second and third queries.

The most frequent values method's estimate for a range expression using the "<" operator is the sum of the estimates for all the individual key values that are smaller than the key value appearing in the range expression. For a search criterion (predicate) "column <281", the estimate is the sum of the number of rows with most frequent key values that are less than the key value appearing within the range expression (i.e., "001" and "122"), plus the estimate for the number of rows that do not have a most frequent key value but do have a key value less than the key value appearing in the range expression.

Since the most frequent values method assumes a uniform distribution for all key values other than the stored five most frequent values, the estimate (4,764) for the other key values is the percentage (i.e., (281−000) / (930−000)) of the number of rows that have key values smaller than the key value appearing within the range expression times the number of rows that are not counted as most frequent (i.e. 34897−19129), as follows:

| column < "281": | |
|---|---|
| value "001" | 16,839 occurrences |
| value "122" | +    357 occurrences |
| other values < "281" | +  4,764 occurrences |
| Estimated total | = 21,961 occurrences |

Uniform Distribution Method

The prior art uniform distribution approach described above assumes that each index key value between the lowest and highest existing key values occurs with equal frequency. The estimate for any individual key value is the number of key value occurrences (i.e., 34,897) divided by the number of distinct occurring key values (i.e., 1,207). FIG. 4 shows the uniform distribution method's assumption for the data of FIG. 2. As will be seen, the uniform distribution approach assumes that each key value occurs in 29 rows of the table, regardless of the actual number of occurrences of that value. Thus the estimates for the same "=" type queries analyzed above would be:

| column = "001": | 34,897/1,207 = 29 occurrences |
|---|---|
| column = "278": | 34,897/1,207 = 29 occurrences |
| column = "281": | 34,897/1,207 = 29 occurrences |
| column = "412": | 34,897/1,207 = 29 occurrences |

It is immediately seen that the uniform distribution method grossly underestimates the number of occurrences of the most frequent values in the skewed data. These underestimates can result in wildly inaccurate estimates of access and processing times, and extremely inefficient choices of access paths.

The uniform distribution method's estimate for a range expression using the "<" operator is the sum of the estimates for all the individual key values that are smaller than the key value appearing in the range expression. Since the uniform distribution approach assumes that each key occurs with equal frequency, the estimate for the range expression is the fraction of the number of rows that have key values smaller than the key value appearing within the range expression, times the total number of rows in the table, as follows:

column<"281": 34,897×(281−000) / (930−000)
= 10,545 occurrences

The "equi-width histogram" method associates each bucket with the same number of actual distinct key values. The number of rows in each bucket varies according to the number of rows that contain the distinct key values associated with the bucket. The approach also assumes a uniform distribution of actual occurrences of key values within each bucket. FIG. 5 shows this method's assumed distribution for the actual data of FIG. 2.

The sample of customer data contains 1,207 distinct key values and this discussion assumes the use of 5 (i.e., N=5) buckets. The "Equi-width Bucket" approach therefore places 1,207/5=242 distinct key values in each bucket. Thus, the first bucket contains the range from 0 to 172, and a total of 21,733 rows have key values within this range. The second bucket contains the range from 172 to 275, and 3,904 rows have key values within this range. The third bucket contains the range from 275 to 282, and 695 rows have key values within this range. The fourth bucket contains the range from 282 to 286, and 777 rows have key values within this range. The fifth bucket contains the range from 286 to 930, and 7,788 rows have key values within this range.

The estimated number of occurrences for any individual key value is the number of key value occurrences in the bucket containing the individual key value, divided by the number of distinct key values associated with the bucket (i.e., 242). For example, the estimate for the "column=278" predicate is the number of rows (i.e., 695) in the bucket containing key value 278, divided by the number of distinct key values associated with the bucket (i.e., 242). Thus, the occurrence estimates for the four "=" type queries considered in this comparison would be:

| | | |
|---|---|---|
| column = "001": | 21,733/242 = | 90 occurrences |
| column = "278": | 695/242 = | 3 occurrences |
| column = "281": | 695/242 = | 3 occurrences |
| column = "412": | 7,788/242 = | 33 occurrences |

With the equi-width histogram method, the estimate for the range expression using the "<" operator is the sum of the estimates for all the individual key values that are smaller than the key value appearing in the range expression. For the "column<281" predicate, the estimate is the sum of the number of rows in the first bucket plus the sum of the number of rows in the second bucket plus some number of rows from the third bucket. Since the equi-width approach assumes a uniform distribution of key values within a bucket, the estimate for the third bucket is the percentage (i.e., (281−275) / (282−275)) of the number of rows that have key values smaller than the key value appearing within the range expression times the number of rows in the bucket (i.e., 695). Thus, the estimate for the "<" type query would be:

| column < "281": | |
|---|---|
| first bucket: | 21,733 occurrences |
| second bucket: | + 3,904 occurrences |
| third bucket: | + 596 occurrences |
| (695 × (281 − 275)/(282 − 275)) | |
| Estimated total: | = 26,233 occurences |

Equi-height Histogram Method

The "equi-height histogram" method of Piatetsky-Shapiro et al. assumes that each bucket contains the same number of actual occurrences of index key values (i.e., the same number of rows). For the actual data of FIG. 2, this method would place 34,897/5=6,980 rows in each bucket. The number of distinct key values associated with a bucket then varies depending on the distribution of the actual index key values. Boundary key values may appear in adjacent buckets. Like the equi-width histogram method, the equi-height method assumes a uniform distribution of actual occurrences of key values within each bucket.

In FIG. 5, the first bucket contains 6,980 rows with 29 distinct key values in the range from 0 to 1. The second bucket contains 6,980 rows with a key value equal to the value 1. The third bucket contains 6,980 rows with 160 distinct key values in the range from 1 to 130. The fourth bucket contains 6,980 rows with 858 distinct key values in the range from 130 to 310. The fifth bucket contains 6,980 rows with 164 distinct key values in the range from 310 to 930.

This method's estimated number of occurrences for any individual key value is the sum of the number of key value occurrences in each of the buckets containing the individual key value. For example, the estimate for the "column=001" search criterion is the number of rows in the buckets with the key value "001", i.e., in the first, second and third buckets. Since the equi-height approach assumes a uniform distribution of key values within a bucket, the estimate for the first bucket is the number of rows that correspond to the bucket (i.e., 6,980) divided by the number of distinct key values associated with the bucket (i.e., 29). The estimate for the second bucket is the entire bucket or 6,980 rows. The estimate for the third bucket is again the number of rows that correspond to the bucket (i.e., 6,980) divided by the number of distinct key values associated with the bucket (i.e., 160).

| | |
|---|---|
| column = "001": | 7,265 occurrences |
| (6,980/29 + 6,980 + 6,980/160) | |
| column = "278": | 9 occurrences |
| (6,980/858) | |
| column = "281": | 9 occurrences |
| (6,980/858) | |
| column = "412": | 43 occurrences |
| (6,980/164) | |

For a range expression using the "<" operator, this method's estimated number of occurrences is the sum of the estimates for all the individual key values that are smaller than the key value appearing in the range expression. For the criterion "column<281", this would include all of the rows in the first three buckets, plus some number of rows from the fourth bucket. Since the equi-height approach assumes a uniform distribution of key values within a bucket, the estimate for the fourth bucket is the percentage (i.e., (281−130) / (310−130)) of the number of rows that have key values smaller than the key value appearing within the range expression times the number of rows in the bucket (i.e., 6,980). The result would therefore be:

| column < "281": | |
|---|---|
| first bucket: | 6,980 occurrences |
| second bucket: | 6,980 occurrences |
| third bucket: | 6,980 occurrences |
| fourth bucket: | + 5,856 occurrences |
| (6,980 × (281 − 130)/(310 − 130)) | |
| Estimated total: | = 21,961 occurences |

Summary

Table 1 summarizes each method's calculated estimates of rows matching the search criteria used in this comparison.

TABLE 1

Comparison of "Most Frequent Values" and Prior Art Methods

| | | Calculated Estimates | | | |
|---|---|---|---|---|---|
| Query Operator | Actual Occur- rences (FIG. 2) | Most Frequent Values (FIG. 3) | Equi- Height (FIG. 6) | Equi- Width (FIG. 5) | Uniform Distri- bution (FIG. 4) |
| C = 001 | 16,839 | 16,839 | 7,265 | 90 | 29 |
| C = 278 | 54 | 13 | 9 | 3 | 29 |
| C = 281 | 4 | 13 | 9 | 3 | 29 |
| C = 412 | 1,109 | 1,109 | 43 | 33 | 29 |
| C < 281 | 26,312 | 21,961 | 26,796 | 26,233 | 10,545 |

Inspection of Table 1 shows that the most frequent values method of this invention is much more accurate than the prior art methods in estimating the number of rows satisfying queries using the "=" operator. The most frequent value method is superior to the uniform distribution method in gauging the "<" type query, and is not significantly less accurate that the other prior art methods.

The "uniform distribution" approach can cause the selection of an access path that would take orders of magnitude higher CPU and elapsed times when presented with the type of query (including the "=" operator) most sensitive to inaccurate estimates. Furthermore, the comparison indicates that the "equi-width histogram" method is often not much better. The prior art's "equi-height histogram" method, and the "most frequent values" method of this invention, are definitely more reliable approaches for selecting access paths. This invention's method is better than the equi-height histogram method, because it provides a precise estimate for those cases with extreme skews which cause the severest performance problems. In addition, the more skewed the distribution, the more efficient the most frequent values method becomes.

It will be appreciated that, although a specific implementation of this invention has been described above for purposes of illustration, various modifications and extensions may be made without departing from the spirit and scope of the invention. For example, the statistics may be collected not only on the first column of the index key but also on the combination of additional columns in the index key to provide further refinement to filter factor calculation when multiple search arguments match a given index. The number of most frequently occurring values collected and stored can be varied as needed to produce suitably accurate estimates of access and processing times. For example, the number could be selected so that all values occurring more than a selected threshold number of times (e.g. more than 10% of the total occurrences in the index) would be stored. Alternatively the number could be selected so that the sum (FSUM) of the percentage frequencies of occurrence of the stored values would be greater than a selected threshold (e.g. 50% of the total occurrences in the index). In general, as the number of stored values increases, both the accuracy of the optimizer's estimates and the overhead required to maintain the stored most frequent values increase. In addition, the most frequent values can be stored anywhere so long as they are accessible to the optimizer.

Furthermore, besides the comparison operators "=", "<", ">" and "BETWEEN" already described, additional operators including "LIKE", "NOT LIKE", "IN list", "NOT IN list" "NOT =", "NOT BETWEEN", ">=", "<=", "NOT <", and "NOT >" can also be supported by the "most frequent values" method of this invention.

This invention also applies to queries containing program variables rather than literals. The N most frequently occurring values and their corresponding percentage frequencies of occurrence can be used when the query is executed during the execution phase 26 (when the value of a program variable is known) to calculate more accurate filter factors and thereby choose the most efficient access path. This differs from the Lakshmi et al. proposal, in which extensive statistics on reference patterns are used to estimate the filter factors.

Finally, the most frequent values method of this invention can be readily used in numerous other data base management systems which require accurate estimates of numbers of page accesses for queries, and is not limited to systems including a bind phase.

Accordingly, the scope of protection of this invention is limited only by the following claims.

We claim:

1. In a method for accessing data of a relational data base management system having at least one index, the improvement characterized by the steps performed by a computer of:
    (a) selecting a number of most frequently occurring values of at least part of a key of the index, the number being greater than zero and less than a total number of such values;
    (b) collecting frequency of occurrence statistics for the selected most frequently occurring values of the index;
    (c) estimating a time required for using the index as the access path, based at least in part on the collected frequency of occurrence statistics;
    (d) selecting an access path based at least in part on the estimated time; and
    (e) accessing the data using the selected access path.

2. The method of claim 1, wherein frequencies of occurrence of the values other than the collected most frequently occurring values are assumed to be uniformly distributed.

3. The method of claim 1, wherein the statistics comprise the most frequently occurring values, and their respective percentage frequencies of occurrence.

4. The method of claim 1, wherein the number of most frequently occurring values is selected so that a sum of frequencies of occurrence of the selected most frequently occurring values is greater than a selected threshold.

5. The method of claim 1, wherein the number of most frequently occurring values is selected to include all values occurring with more than a selected threshold frequency as most frequently occurring values.

6. The method of claim 1, wherein the collected statistics are stored within the data base management system.

7. The method of claim 6, wherein the collected statistics are stored in a system catalog.

8. The method of claim 1, wherein times required for random and sequential page accesses and for processing time are estimated separately, based at least in part on the index's statistics.

9. A method for accessing data of a relational data base management system having at least one index, comprising the steps performed by a computer of:
 (a) selecting a number of most frequently occurring values of at least part of a key of the index, the number being greater than zero and less than a total number of values of said at least part of the key;
 (b) collecting frequency of occurrence statistics for the selected most frequently occurring values of the index;
 (c) storing the statistics in the system;
 (d) estimating a time required for using the index as the access path, based at least in part on the stored frequency of occurrence statistics;
 (e) selecting an access path based at least in part on the estimated time; and
 (f) accessing the data using the selected access path.

* * * * *